(12) United States Patent
Ukita et al.

(10) Patent No.: US 9,402,198 B2
(45) Date of Patent: Jul. 26, 2016

(54) COMMUNICATION DEVICE AND METHOD OF DETERMINING COMMUNICATION METHOD

(71) Applicant: Panasonic Intellectual Property Management Co., Ltd., Osaka (JP)

(72) Inventors: Yosuke Ukita, Osaka (JP); Hiroshi Hayashino, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 14/395,523

(22) PCT Filed: Feb. 21, 2014

(86) PCT No.: PCT/JP2014/000935
§ 371 (c)(1),
(2) Date: Oct. 20, 2014

(87) PCT Pub. No.: WO2014/136398
PCT Pub. Date: Sep. 12, 2014

(65) Prior Publication Data
US 2015/0131464 A1    May 14, 2015

(30) Foreign Application Priority Data

Mar. 7, 2013   (JP) ................. 2013-045369

(51) Int. Cl.
*H04W 24/08*   (2009.01)
*H04W 88/10*   (2009.01)
*H04W 48/16*   (2009.01)
*H04W 40/16*   (2009.01)
*H04W 52/02*   (2009.01)

(52) U.S. Cl.
CPC ............. *H04W 24/08* (2013.01); *H04W 40/16* (2013.01); *H04W 48/16* (2013.01); *H04W 52/0238* (2013.01); *H04W 88/10* (2013.01)

(58) Field of Classification Search
CPC ............ H04W 26/0236; H04W 40/16; H04W 52/0238
See application file for complete search history.

(56) References Cited

U.S. PATENT DOCUMENTS

| | | | |
|---|---|---|---|
| 2001/0010491 A1* | 8/2001 | Marneweck | B60R 25/2072 340/10.33 |
| 2003/0119568 A1* | 6/2003 | Menard | H04W 52/0229 455/572 |
| 2006/0159003 A1* | 7/2006 | Nanda | H04W 16/10 370/203 |

(Continued)

FOREIGN PATENT DOCUMENTS

| | | |
|---|---|---|
| JP | 2004-320446 | 11/2004 |
| JP | 2006-270540 | 10/2006 |

(Continued)

OTHER PUBLICATIONS

International Search Report issued May 27, 2014 in International (PCT) Application No. PCT/JP2014/000935.

*Primary Examiner* — Christopher Crutchfield
(74) *Attorney, Agent, or Firm* — Wenderoth, Lind & Ponack, L.L.P.

(57) ABSTRACT

A network in which two or more communication schemes coexist, in which a wireless control device identifies a communication scheme of a frame transmitted by a wireless terminal device, making reception possible. The wireless control device, upon detecting a receive signal strength of receive data, determines a signal strength at a non-overlapping frequency band of each communication scheme and thereby judges the communication scheme of the receive data.

17 Claims, 17 Drawing Sheets

(56) References Cited

U.S. PATENT DOCUMENTS

| | | |
|---|---|---|
| 2006/0189352 A1 | 8/2006 | Nagai et al. |
| 2008/0013496 A1* | 1/2008 | Dalmases ......... H04W 72/0446 370/336 |
| 2012/0082040 A1* | 4/2012 | Gong ................ H04W 74/0816 370/252 |

FOREIGN PATENT DOCUMENTS

| | | |
|---|---|---|
| JP | 2012-060456 | 3/2012 |
| JP | 2012-182698 | 9/2012 |
| WO | 2004/102889 | 11/2004 |
| WO | 2012/023747 | 2/2012 |
| WO | 2014/007008 | 1/2014 |

* cited by examiner

FIG.2

| Communication scheme | Bit-rate (kbps) | Center frequency (MHz) | Bandwidth (kHz) |
|---|---|---|---|
| A | 50 | 924.0 | 200 |
| B | 100 | 924.1 | 400 |

COMMUNICATION DEVICE AND METHOD OF DETERMINING COMMUNICATION METHOD

TECHNICAL FIELD

The present invention relates to communication devices and communication scheme judgment methods that determine a communication scheme of receive data in cases in which the communication devices receive data of different communication schemes in a communication network.

BACKGROUND ART

A wireless communication network represented in the Institute of Electrical and Electronics Engineers (IEEE) 802.11 and 802.15.4 standards typically includes a wireless communication device as an access point (hereafter, "control device"), and a plurality of wireless communication devices as stations (hereafter, "terminal devices").

In such a wireless communication network, for example, in home network use, a network may be posited in which a communication scheme of an 802.11 standard and a communication scheme of an 802.15.4 standard coexist. For example, a computer and an audio-visual (AV) device such as a television communicate by using the 802.11 standard, and major appliances such as an air conditioner and refrigerator communicate by using the 802.15.4 standard. Further, other wireless networks may be posited in which an older communication scheme of a previously-released product coexists with a new communication scheme of a latest-model product.

In such wireless networks it is preferable from a cost, operation, and maintenance perspective that the number of installed control devices does not increase in proportion to the number of communication schemes, but that, as illustrated in FIG. 17, a single installed control device 208 supports all communication schemes.

However, because the control device 208 does not know when a frame will be transmitted from a terminal device 202a, 202b of a communication scheme A or a terminal device 209a, 209b of a communication scheme B, the control device 208 is required to be constantly, simultaneously, on standby to receive data of different communication schemes.

With respect to this problem, technology is disclosed in which the control device 208 has a plurality of wireless integrated circuits (ICs) (for example, see Patent Literature 1 or Patent Literature 2). According to such technology, frames of different communication schemes are each demodulated and received by wireless ICs or PHY layers, and therefore standby to simultaneously receive frames of different communication schemes is possible.

CITATION LIST

Patent Literature

[Patent Literature 1]
Japanese Patent Application Publication No. 2004-320446
[Patent Literature 2]
International Patent Application Publication No. WO 2004/102889

SUMMARY OF INVENTION

Technical Problem

However, according to the above-mentioned conventional technology, the control device requires wireless ICs equal in number to corresponding communication schemes, and therefore the number of wireless ICs mounted on the control device increases. Thus, cost of the control device increases.

Here, the present invention provides a communication device and judgment method of communication schemes that, even when wirelessly communicating using different communication schemes for each terminal device that is a communication counterpart, allows data communication corresponding to each communication scheme using just one wireless IC.

Solution to Problem

A communication device pertaining to one aspect of the present invention is a communication device comprising: a receiver that receives a signal transmitted via a communication network, the signal being transmitted within one of a frequency band of a channel corresponding to a first communication scheme and a frequency band of a channel corresponding to a second communication scheme that includes an overlap frequency band that overlaps at least a portion of the frequency band corresponding to the first communication scheme; a detection unit that detects a first signal strength of the signal received by the receiver within the overlap frequency band; and a reception control unit that, when the first signal strength exceeds a predefined threshold, causes the detection unit to detect a second signal strength within a frequency band that corresponds to one of the first communication scheme and the second communication scheme and does not overlap with the overlap frequency band, judges whether the signal received by the receiver corresponds to the first communication scheme or the second communication scheme based on the second signal strength, and performs reception processing of the signal according to one of the first communication scheme and the second communication scheme, according to the judgment.

Advantageous Effects of Invention

According to the above aspect, instead of mounting a number of wireless ICs equal to a number of communication schemes, mounting a single wireless IC is sufficient to receive data corresponding to each communication scheme, and therefore a manufacturing cost of a wireless communication device that is an access point is decreased. Further, a control device may support a plurality of communication schemes, and backwards compatibility is also possible, for example a new communication scheme being backward compatible with an existing communication scheme.

BRIEF DESCRIPTION OF DRAWINGS

FIG. 2 is a table illustrating one example of parameters of a communication scheme A and a communication scheme B in embodiment 1.

Figure 1:
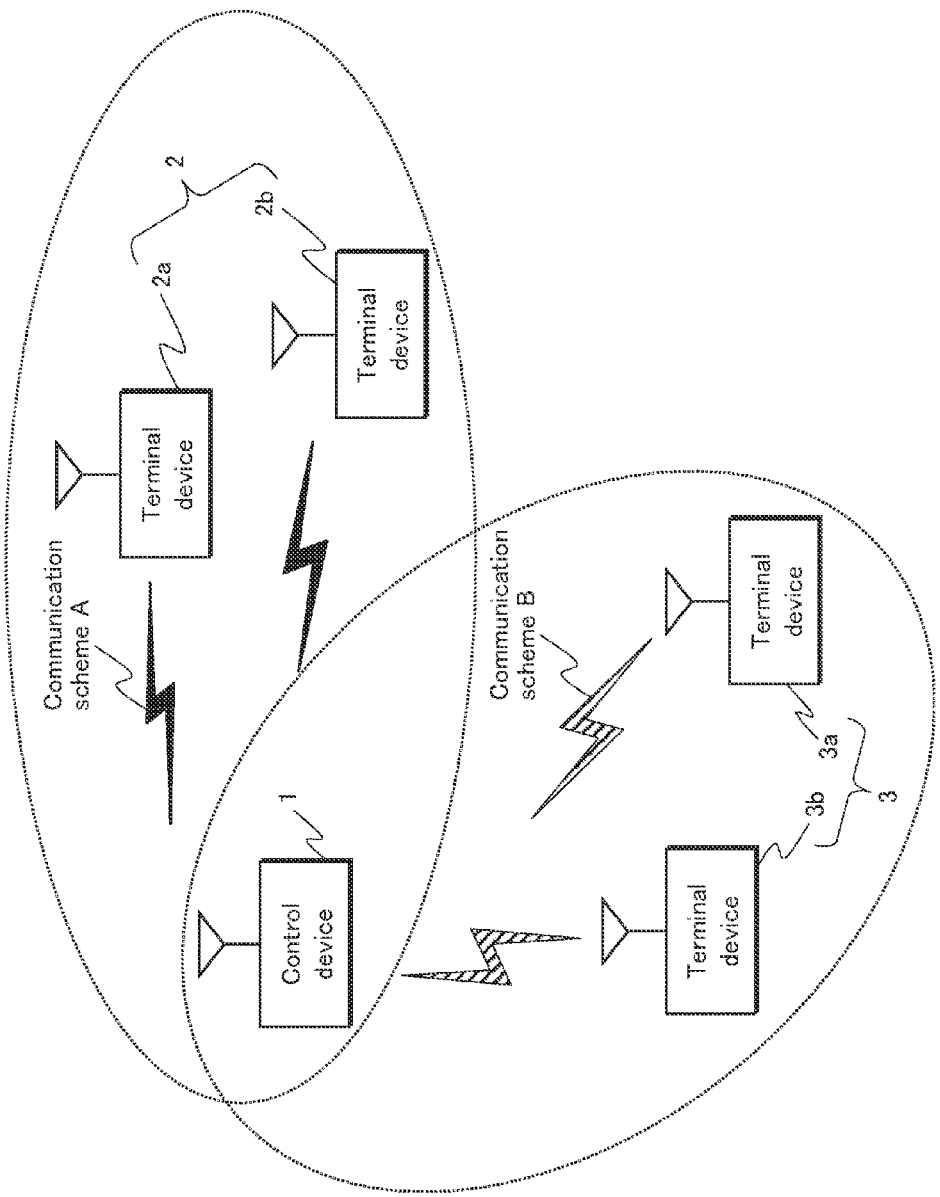
FIG. 1 is a diagram illustrating one example of a network configuration in embodiment 1.

EMBODIMENTS (1) A communication device pertaining to an embodiment of the present invention is a communication device comprising: a receiver that receives a signal transmitted via a communication network, the signal being transmitted within one of a frequency band of a channel corresponding to a first communication scheme and a frequency band of a channel corresponding to a second communication scheme that includes an overlap frequency band that overlaps at least a portion of the frequency band corresponding to the first communication scheme; a detection unit that detects a first signal strength of the signal received by the receiver within the overlap frequency band; and a reception control unit that, when the first signal strength exceeds a predefined threshold, causes the detection unit to detect a second signal strength within a frequency band that corresponds to one of the first communication scheme and the second communication scheme and does not overlap with the overlap frequency band, judges whether the signal received by the receiver corresponds to the first communication scheme or the second communication scheme based on the second signal strength, and performs reception processing of the signal according to one of the first communication scheme and the second communication scheme, according to the judgment.

(2) In the communication device of (1), a center frequency of the channel corresponding to the second communication scheme may be higher than a center frequency of the channel corresponding to the first communication scheme, when the first signal strength exceeds the predefined threshold, the detection unit may detect the second signal strength in a frequency band corresponding to the second communication scheme that is higher than the overlap frequency band and does not overlap with the overlap frequency band, and when the second signal strength exceeds a predefined threshold, the reception control unit may judge that the signal received by the receiver corresponds to the second communication scheme.

(3) In the communication device of (2), when the second signal strength is equal to or less than the predefined threshold, the reception control unit may judge that the signal received by the receiver corresponds to the first communication scheme.

(4) In the communication device of (1), the frequency band of the channel corresponding to the second communication scheme may be broader than the frequency band of the channel corresponding to the first communication scheme, the frequency band of the channel corresponding to the first communication scheme may be included within the frequency band of the channel corresponding to the second communication scheme, and a start value of the frequency band of the first communication scheme and a start value of the frequency band of the second communication scheme may be set to be equal.

(5) A center frequency of the channel corresponding to the second communication scheme may be higher than a center frequency of the channel corresponding to the first communication scheme, when the first signal strength exceeds the predefined threshold, the detection unit may detect the second signal strength in a frequency band corresponding to the first communication scheme that is lower than the overlap frequency band and does not overlap with the overlap frequency band, and when the second signal strength exceeds a predefined threshold, the reception control unit may judge that the signal received by the receiver corresponds to the first communication scheme.

(6) In the communication device of (5), when the second signal strength is equal to or less than the predefined threshold, the reception control unit may judge that the signal received by the receiver corresponds to the second communication scheme.

(7) In the communication device of any one of (1)-(6), a channel control unit may be included that changes channels corresponding to one of the first communication scheme and the second communication scheme in response to a change of channels corresponding to the other one of the first communication scheme and the second communication scheme, wherein the channel control unit may change the channels corresponding to the one of the first communication scheme and the second communication scheme such that at least a portion of the frequency band of one channel after the change corresponding to the one of the first communication scheme and the second communication scheme overlaps at least a portion of the frequency band of the other channel after the change corresponding to the other one of the first communication scheme and the second communication scheme.

(8) In the communication device of (7), a channel list storage unit may be included that stores a channel list of combinations of channels corresponding to each communication scheme, according to which at least a portion of a frequency band of each channel corresponding to the first communication scheme overlaps at least a portion of a frequency band of a corresponding channel corresponding to the second communication scheme, wherein the channel control unit may change the channels corresponding to the one of the first communication scheme and the second communication scheme by referencing the channel list storage unit.

(9) In the communication device of any one of (1)-(6), when a difference value between the first signal strength and the second signal strength is at least a predefined value, the reception control unit may judge that the communication scheme of the signal received by the receiver is the first communication scheme, and when the difference value is less than the predefined value, the reception control unit may judge that the communication scheme of the signal received by the receiver is the second communication scheme.

(10) In the communication device of any one of (1)-(6), at least one empty channel may be allocated to each interval between channels corresponding to the first communication scheme, and the detection unit may detect the second signal strength by using the at least one empty channel.

(11) In the communication device of (10), the at least one empty channel may be provided in a plurality, and the detection unit may detect the second signal strength by using an empty channel from among the plurality of empty channels.

(12) In the communication device of any one of (1)-(6), a transmission bandwidth of the second communication scheme may be an integer multiple of a transmission bandwidth of the first communication scheme.

(13) In the communication device of (12), the transmission bandwidth of the first communication scheme may be 200 kHz and the transmission bandwidth of the second communication scheme may be 400 kHz.

(14) In the communication device of any one of (1) to (6), the communication network may be a wireless communication network.

(15) A method pertaining to an embodiment of the present invention is a method of judging a communication scheme of receive data, executed by a communication device that receives data corresponding to different communication schemes via a communication network, the method comprising: receiving a signal transmitted within one of a frequency band of a channel corresponding to a first communication scheme and a frequency band of a channel corresponding to a second communication scheme that includes an overlap frequency band that overlaps at least a portion of the frequency band corresponding to the first communication scheme; detecting a first signal strength of the signal within the overlap frequency band; and when the first signal strength exceeds a predefined threshold, detecting a second signal strength within a frequency band that corresponds to one of the first communication scheme and the second communication scheme and that does not overlap with the overlap frequency band, judging whether the signal corresponds to the first communication scheme or the second communication scheme based on the second signal strength, and performing reception processing of the signal according to either the first communication scheme or the second communication scheme, according to the judgment.

(16) An integrated circuit pertaining to an embodiment of the present invention is an integrated circuit comprising: a receiver that receives a signal transmitted via a communication network, the signal being transmitted within one of a frequency band of a channel corresponding to a first communication scheme and a frequency band of a channel corresponding to a second communication scheme that includes an overlap frequency band that overlaps at least a portion of the frequency band corresponding to the first communication scheme; a detection unit that detects a first signal strength of the signal received by the receiver within the overlap frequency band; and a reception control unit that, when the first signal strength exceeds a predefined threshold, causes the detection unit to detect a second signal strength within a frequency band that corresponds to one of the first communication scheme and the second communication scheme and does not overlap with the overlap frequency band, judges whether the signal received by the receiver corresponds to the first communication scheme or the second communication scheme based on the second signal strength, and performs reception processing of the signal according to one of the first communication scheme and the second communication scheme, according to the judgment.

(17) A program pertaining to an embodiment of the present invention is a program that causes a computer to execute a process of judging a communication scheme of receive data, which is executed by a communication device that receives data corresponding to different communication schemes via a communication network, the process comprising: receiving a signal transmitted within one of a frequency band of a channel corresponding to a first communication scheme and a frequency band of a channel corresponding to a second communication scheme that includes an overlap frequency band that overlaps at least a portion of the frequency band corresponding to the first communication scheme; detecting a first signal strength of the signal within the overlap frequency band; and when the first signal strength exceeds a predefined threshold, detecting a second signal strength within a frequency band that corresponds to one of the first communication scheme and the second communication scheme and that does not overlap with the overlap frequency band, judging whether the signal corresponds to the first communication scheme or the second communication scheme based on the second signal strength, and performing reception processing of the signal according to either the first communication scheme or the second communication scheme, according to the judgment.

Each embodiment of the present invention is described below with reference to the drawings.

(Embodiment 1)

FIG. 1 is a diagram illustrating a configuration example of a wireless communication network in embodiment 1 of the present invention. In FIG. 1, a control device 1 communicates with terminal devices 2 and terminal devices 3 using different communication schemes. The control device 1 communicates with a terminal device 2a and a terminal device 2b using a communication scheme A. Further, the control device 1 communicates with a terminal device 3a and a terminal device 3b using a communication scheme B.

The terminal devices 2 and the terminal devices 3 are, for example, household electronics such as a refrigerator, television, etc., heat source devices such as an IH cooking heater, or electrically-driven devices such as an electric car.

Note that the number depicted of the terminal devices 2 and terminal devices 3 communicating with the control device 1 in FIG. 1 is just an example, and the present invention is not limited in this way.

FIG. 2 illustrates one example of specifications of the communication scheme A and the communication scheme B in embodiment 1. In embodiment 1, the communication scheme A has a bit-rate of 50 kbps, a center frequency of 924.0 MHz, and a bandwidth of 200 kHz. The communication scheme B has a bit-rate of 100 kbps, a center frequency of 924.1 MHz, and a bandwidth of 400 kHz. However, these three conditions illustrate example conditions, and there may be other conditions such as different modulation schemes, differences corresponding to data whitening, etc.

Figure 3:
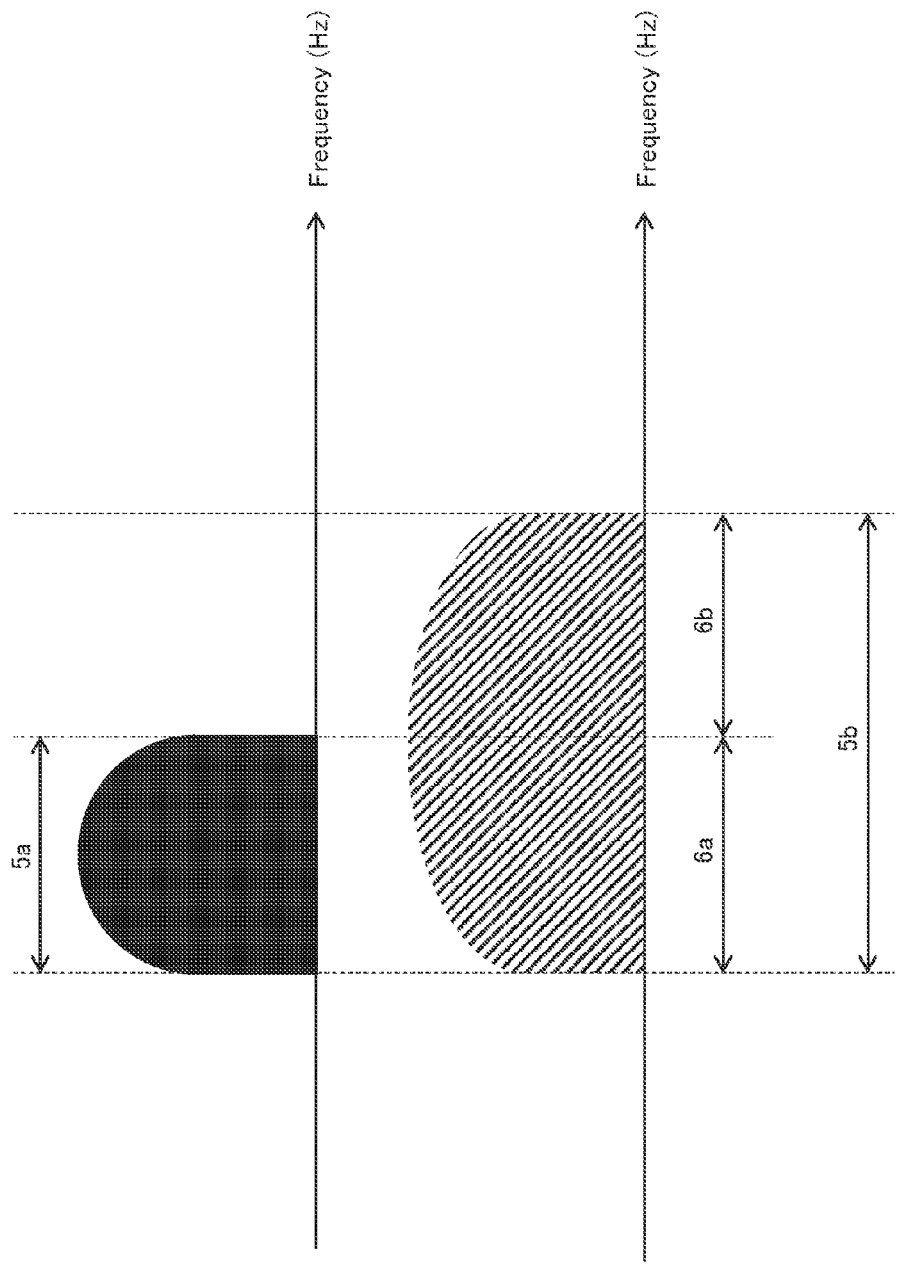
FIG. 3 is a diagram illustrating spectrum signals of the communication scheme A and the communication scheme B in embodiment 1.

FIG. 3 illustrates spectrum signals of the communication scheme A and the communication scheme B in embodiment 1, expressed along a frequency axis. In FIG. 3, a unit channel of the communication scheme A is defined as 5a and a unit channel of the communication scheme B is defined as 5b. As illustrated in FIG. 3, in embodiment 1, a frequency band of the communication scheme A and a frequency band of the communication scheme B exist in overlapping frequencies. A frequency band that overlaps is defined as an overlapping frequency band 6a and a frequency band that does not overlap is defined as a non-overlapping frequency band 6b. Note that frequency bands of each communication scheme are defined as overlapping in advance by an operational system.

Figure 4:
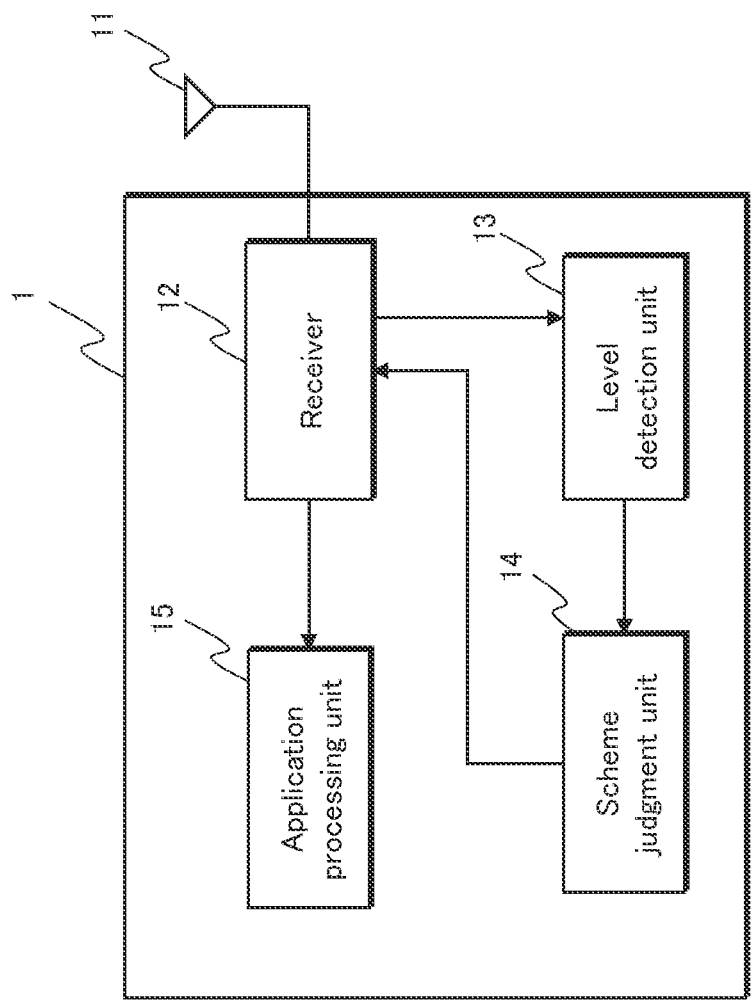
FIG. 4 is a function block diagram illustrating a configuration of a control device in embodiment 1.

FIG. 4 is a diagram illustrating an example of function blocks of the control device 1 in embodiment 1. The control device 1 includes an antenna 11, a receiver 12, a level detection unit 13, a scheme judgment unit 14, and an application processing unit 15.

The receiver 12 has functions such as setting a bit-rate, setting a frequency, receiving data via the antenna 11, demodulating receive data, etc. Functions of a physical layer of IEEE 802.15.4 or other wireless communication systems are examples of the receiver 12.

The level detection unit 13 has a function of measuring signal strength of data received by the receiver 12 and a function of making a threshold value judgment of signal strength thus measured. Clear channel assessment (CCA), carrier sense (CS), energy detect (ED), etc., are examples of a function of the level detection unit 13.

The scheme judgment unit 14, using a function of the level detection unit 13, judges whether data received by the receiver 12 is of the communication scheme A or the communication scheme B. A detailed description of the scheme judgment unit 14 is provided later using the flowchart of FIG. 7.

The application processing unit 15 executes application processing of data received by the receiver 12. Application processing is processing that analyzes data content transmitted from each terminal device, for example, analysis of a media access control (MAC) header, a MAC payload, etc.

Note that the scheme judgment unit 14 and the application processing unit 15 may be configured as a "receiver control unit" (not illustrated).

Figure 5:
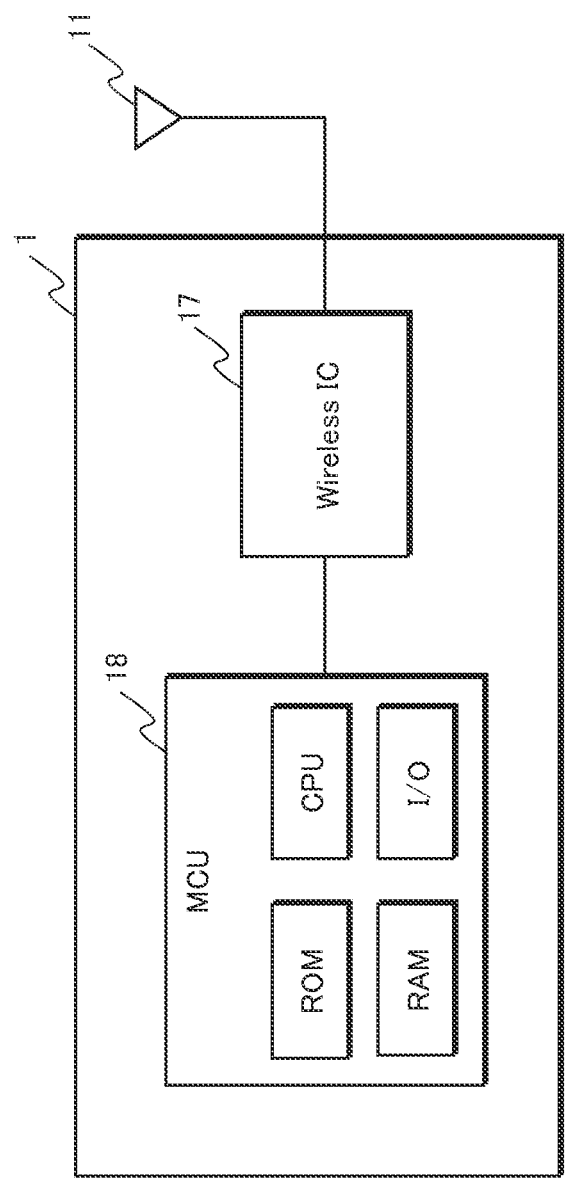
FIG. 5 is a diagram illustrating one example of a hardware configuration of the control device in embodiment 1.

FIG. 5 is a diagram illustrating one example of a hardware configuration of the control device 1 in embodiment 1.

A wireless IC 17 is an integrated circuit that performs modulation and demodulation of wireless communication.

A micro control unit (MCU) 18 is a microcontroller that is an integrated circuit provided with an input/output (I/O) as an external interface and internally a central processing unit (CPU) core, memory such as read only memory (ROM), random access memory (RAM), etc.

Note that the level detection unit 13, the scheme judgment unit 14, and the application processing unit 15 in FIG. 4 are implemented in the MCU 18 in FIG. 5. The receiver 12 is implemented in the wireless IC 17. Note that the level detection unit 13 may be implemented in the wireless IC 17.

Figure 6:
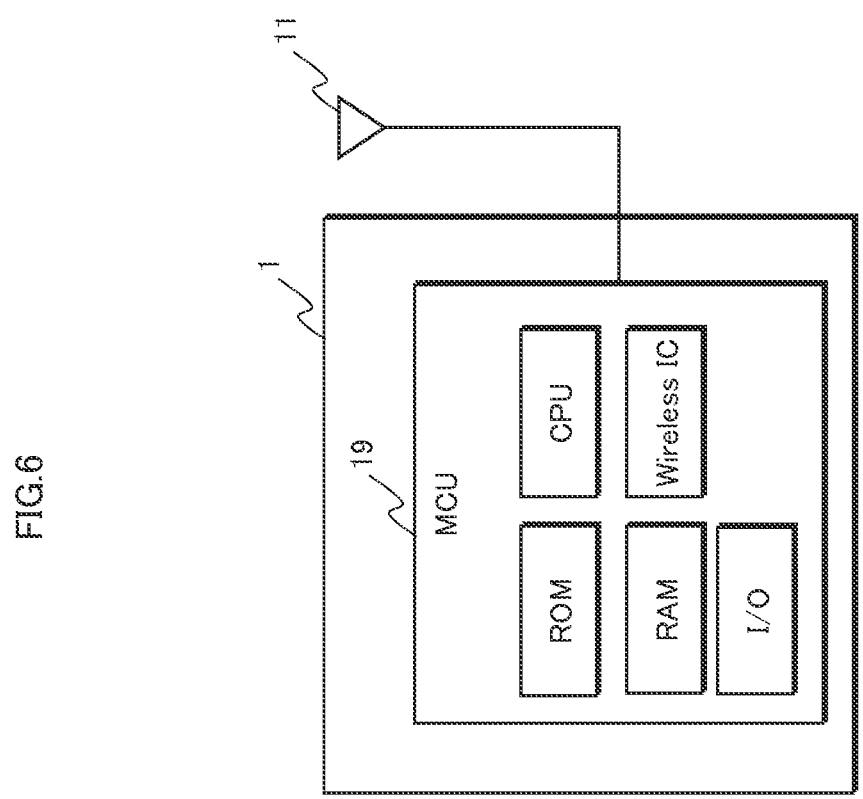
FIG. 6 is a diagram illustrating one example of a hardware configuration of the control device in embodiment 1.

Note that, as illustrated in FIG. 6, the wireless IC 17 and the MCU 18 may be implemented as a single integrated circuit (MCU 19).

Above is description of the network configuration and configuration of the control device 1 pertaining to embodiment 1. The following describes operations of the control device 1 pertaining to embodiment 1.

Figure 7:
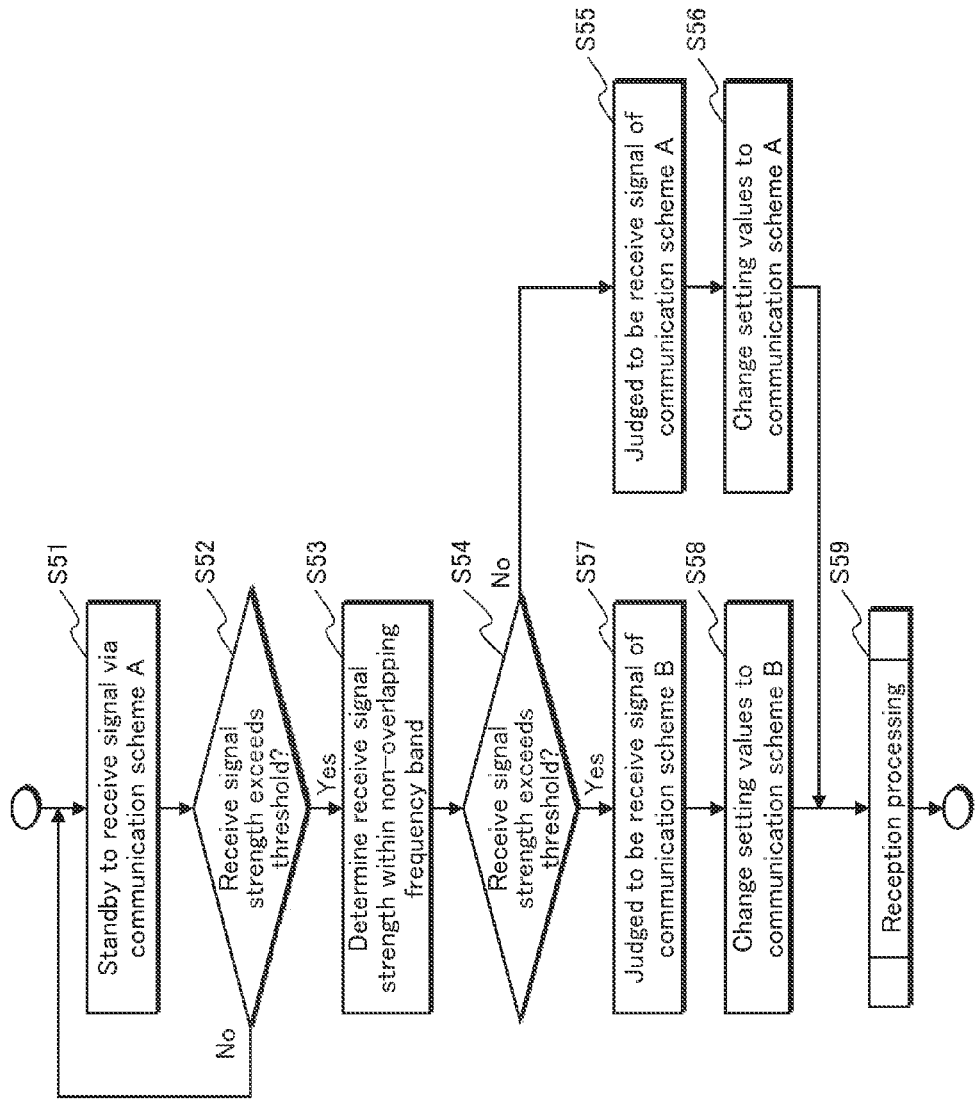
FIG. 7 is a flowchart illustrating a communication scheme judgment process of the control device in embodiment 1.

FIG. 7 is a flowchart illustrating a communication scheme judgment method when the control device 1 in embodiment 1 receives data from the terminal devices 2 and the terminal devices 3.

First, the control device 1 is constantly on standby to receive a signal at a center frequency of the communication scheme A (5a in FIG. 3) (S51). Further, the level detection unit 13 constantly checks whether or not a signal strength of receive data exceeds a predefined threshold (S52).

If the level detection unit 13 determines that the signal strength of receive data exceeds the threshold ("Yes" at S52), the scheme judgment unit 14 changes a frequency value setting of the receiver 12 to a value within a range of a non-overlapping frequency band (6b in FIG. 3). Subsequently, the level detection unit 13 checks a signal strength within the non-overlapping frequency band (S53).

If the signal strength within the non-overlapping frequency band is equal to or less than a threshold ("No" at S54), the scheme judgment unit 14 judges that a communication scheme of the receive data is the communication scheme A (S55).

Subsequently, the scheme judgment unit 14 sets values of the receiver 12, such as bit-rate, center frequency, etc., to correspond to the communication scheme A (S56).

Subsequently, the control device 1 performs reception processing such as synchronization judgment (bit synchronization, frame synchronization), header analysis, payload analysis, etc., according to the communication scheme A (S59).

Further, if the signal strength within the non-overlapping frequency band is greater than the threshold ("Yes" at S54), the scheme judgment unit 14 judges that a communication scheme of the receive data is the communication scheme B (S57).

Subsequently, the scheme judgment unit 14 sets values of the receiver 12, such as bit-rate, center frequency, etc., to correspond to the communication scheme B (S58).

Subsequently, the control device 1 performs reception processing such as synchronization judgment (bit synchronization, frame synchronization), header analysis, payload analysis, etc., according to the communication scheme B (S59).

According to embodiment 1, the control device 1 is first on standby to receive a signal of data at a center frequency of the communication scheme A, and detects a beginning of receive data of an unidentified communication scheme by performing a threshold judgment of the signal strength of the receive data. Subsequently, the control device 1 determines the communication scheme of the receive data by performing a threshold judgment of the signal strength within the non-overlapping frequency band.

Thus, even without including multiple wireless ICs to correspond to each communication scheme, the control device 1 can determine multiple communication schemes using one wireless IC.

[Modification 1]

The following describes modification 1 of embodiment 1.

Figure 8:
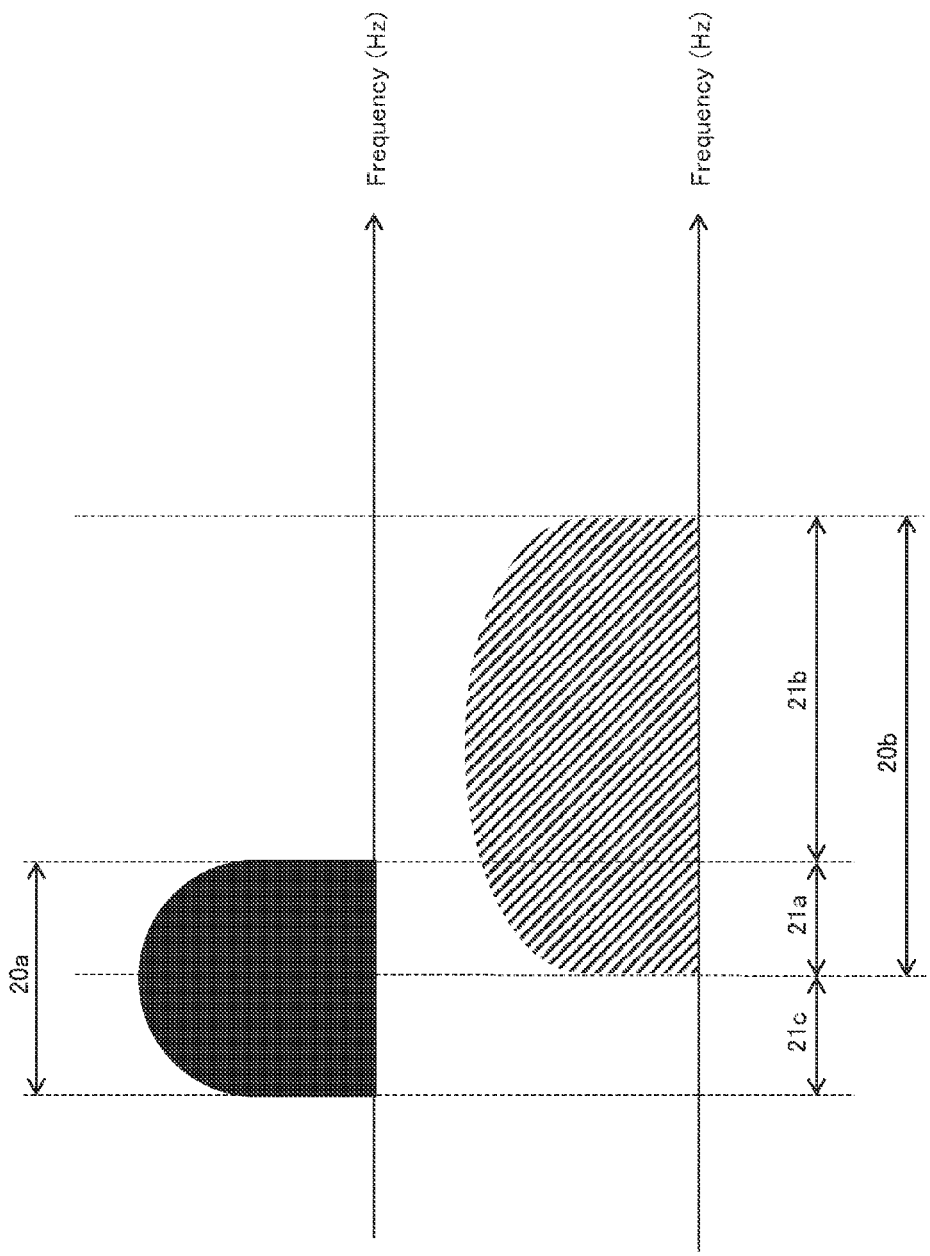
FIG. 8 is a diagram illustrating spectrum signals of the communication scheme A and the communication scheme B in modification 1 of embodiment 1.

FIG. 8 illustrates spectrum signals of the communication scheme A and the communication scheme B in modification 1 of embodiment 1, expressed along a frequency axis. FIG. 8 is different from FIG. 3 in that the overlapping frequency band of the communication scheme A and the communication scheme B differs. Specifically, in FIG. 3, the entire frequency band of the communication scheme A is included within the frequency band of the communication scheme B. On the other hand, as illustrated in FIG. 8, modification 1 differs from embodiment 1 in that a portion of the frequency band of the communication scheme A (21c in FIG. 8) is not included within the frequency band of the communication scheme B.

Here, in FIG. 8, a unit channel of the communication scheme A is defined as 20a and a unit channel of the communication scheme B is defined as 20b. Further, an overlapping frequency band is defined as an overlapping frequency band 21a, and of non-overlapping frequency bands, the higher frequency band is defined as a non-overlapping frequency band 21b and the lower frequency band is defined as a non-overlapping frequency band 21c.

Figure 9:
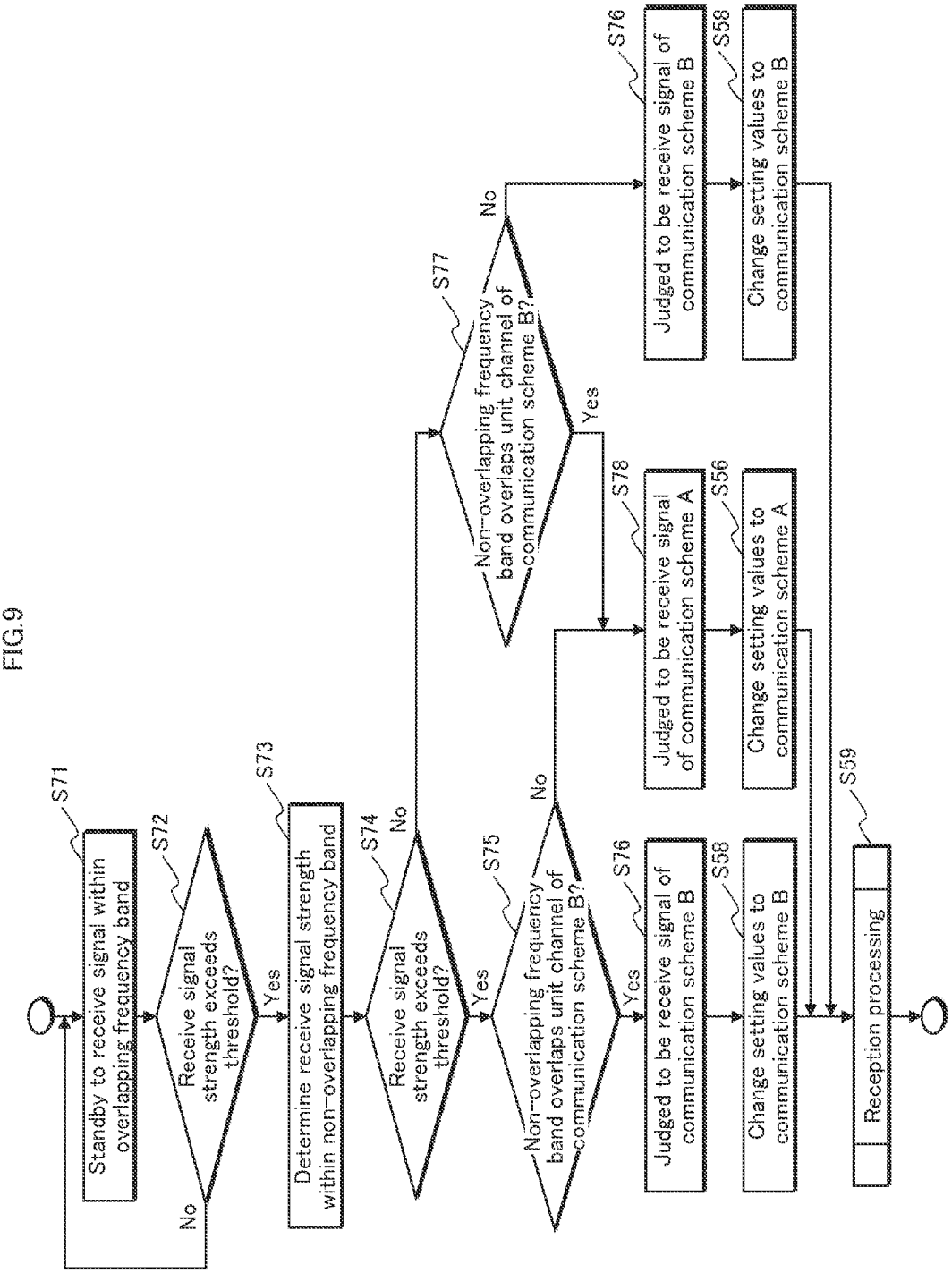
FIG. 9 is a flowchart illustrating a communication scheme judgment process of the control device in modification 1 of embodiment 1.

FIG. 9 is a flowchart illustrating operations of a communication scheme judgment process when the control device 1 in modification 1 of embodiment 1 receives data from the terminal devices 2 and the terminal devices 3. Processing that is the same as processing described with reference to FIG. 7 is assigned the same reference signs, and description thereof is omitted here.

First, the control device 1 is constantly on standby to receive a signal within the overlapping frequency band 21a in FIG. 8 (S71). Further, by using the level detection unit 13, the control device 1 constantly checks whether or not a signal strength of receive data exceeds a predefined threshold (S72).

In S72, when the control device 1 judges that the signal strength exceeds the threshold ("Yes" at S72), the scheme judgment unit 14 changes frequency setting values of the receiver 12 to values of the non-overlapping frequency band (21b or 21c in FIG. 8). Here, values may be set to values of either 21b or 21c. Subsequently, the level detection unit 13 implements judgment of signal strength within the non-overlapping frequency band set at S72 (S73).

The following describes processing when, in S74, the signal strength of receive data exceeds a predefined value ("Yes" at S74).

In S74, when the signal strength within the non-overlapping frequency band exceeds the predefined threshold ("Yes" at S74), the scheme judgment unit 14 checks whether or not the non-overlapping frequency band set in S72 overlaps a unit channel of the communication scheme B (20b in FIG. 8) (S75).

In S75, when the non-overlapping frequency band overlaps the unit channel of the communication scheme B ("Yes" in S75), the scheme judgment unit 14 judges that the communication scheme of the receive data is the communication scheme B (S76). Subsequently, the scheme judgment unit 14 sets values of the receiver 12 to correspond to the communication scheme B (S58) and reception processing is performed (S59).

On the other hand, in S75, when the non-overlapping frequency band does not overlap the unit channel of the communication scheme B ("No" at S75), the scheme judgment unit 14 judges that the communication scheme of the receive data is the communication scheme A (S78). Subsequently, the scheme judgment unit 14 sets values of the receiver 12 to correspond to the communication scheme A (S56) and reception processing is performed (S59).

The following describes processing when, in S74, the signal strength of the receive data does not exceed the predefined value ("No" at S74).

In S74, when the signal strength within the non-overlapping frequency band does not exceed the predefined threshold ("No" at S74), the scheme judgment unit 14 checks whether or not the non-overlapping frequency band overlaps a unit channel of the communication scheme B (20b in FIG. 8) (S77).

In S77, when the non-overlapping frequency band overlaps the unit channel of the communication scheme B ("Yes" at S77), the scheme judgment unit 14 judges that the communication scheme of the receive data is the communication scheme A (S78). Subsequently, the scheme judgment unit 14 sets values of the receiver 12 to correspond to the communication scheme A (S56) and reception processing is performed (S59).

In step S77, when the non-overlapping frequency band does not overlap the unit channel of the communication scheme B ("No" at S77), the scheme judgment unit 14 judges that the communication scheme of the receive data is the communication scheme B (S76). Subsequently, the scheme judgment unit 14 sets values of the receiver 12 to correspond to the communication scheme B (S58) and reception processing is performed (S59). According to modification 1, when only a portion of each of two spectrum signals of two communication schemes overlap, the control device 1 determines the communication scheme of the receive data by performing judgment of signal strength within the non-overlapping frequency band. Note that in S75 and S77, judgment of the communication scheme of the receive data is performed based on whether or not the non-overlapping frequency band overlaps the unit channel of the communication scheme B, but judgment of the communication scheme of the receive data may be performed based on whether or not the non-overlapping frequency band overlaps the unit channel of the communication scheme A.

[Modification 2]

Next, modification 2 of embodiment 1 of the present invention is described.

Figure 10:
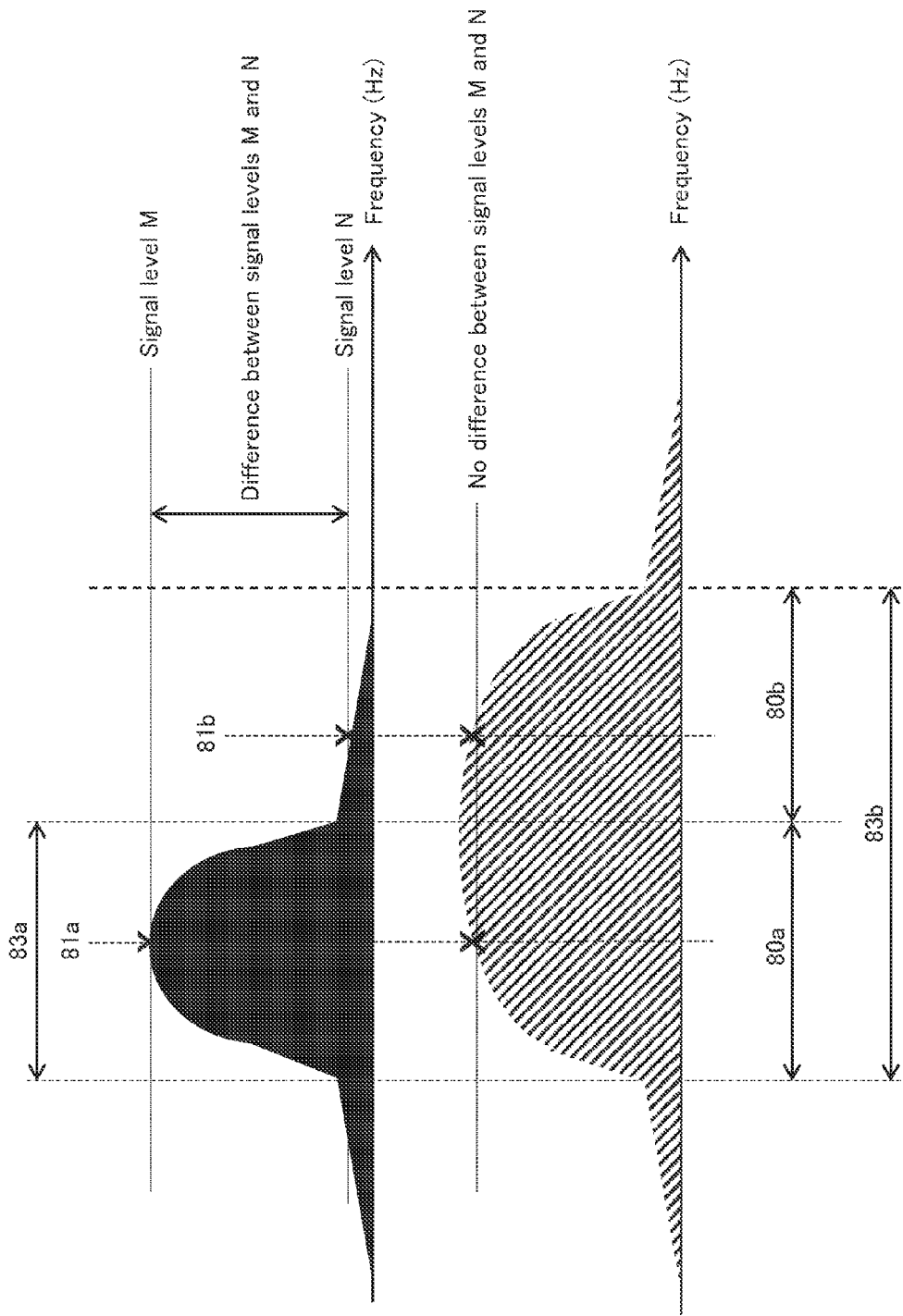
FIG. 10 is a diagram illustrating spectrum signals of the communication scheme A and the communication scheme B in modification 2 of embodiment 1.

FIG. 10 illustrates spectrum signals of the communication scheme A and the communication scheme B in modification 2 of embodiment 1 of the present invention, expressed along a frequency axis. FIG. 10 differs from FIG. 3 in that leakage (side lobes) of the spectrum signals exists, occupying frequency outside the bandwidth.

Here, the unit channel of the communication scheme A in FIG. 10 is defined as 83a and the unit channel of the communication scheme B in FIG. 10 is defined as 83b. Further, excepting the side lobes, a frequency band that overlaps is defined as an overlapping frequency band 80a and a frequency band that does not overlap is defined as a non-overlapping frequency band 80b.

Figure 11:
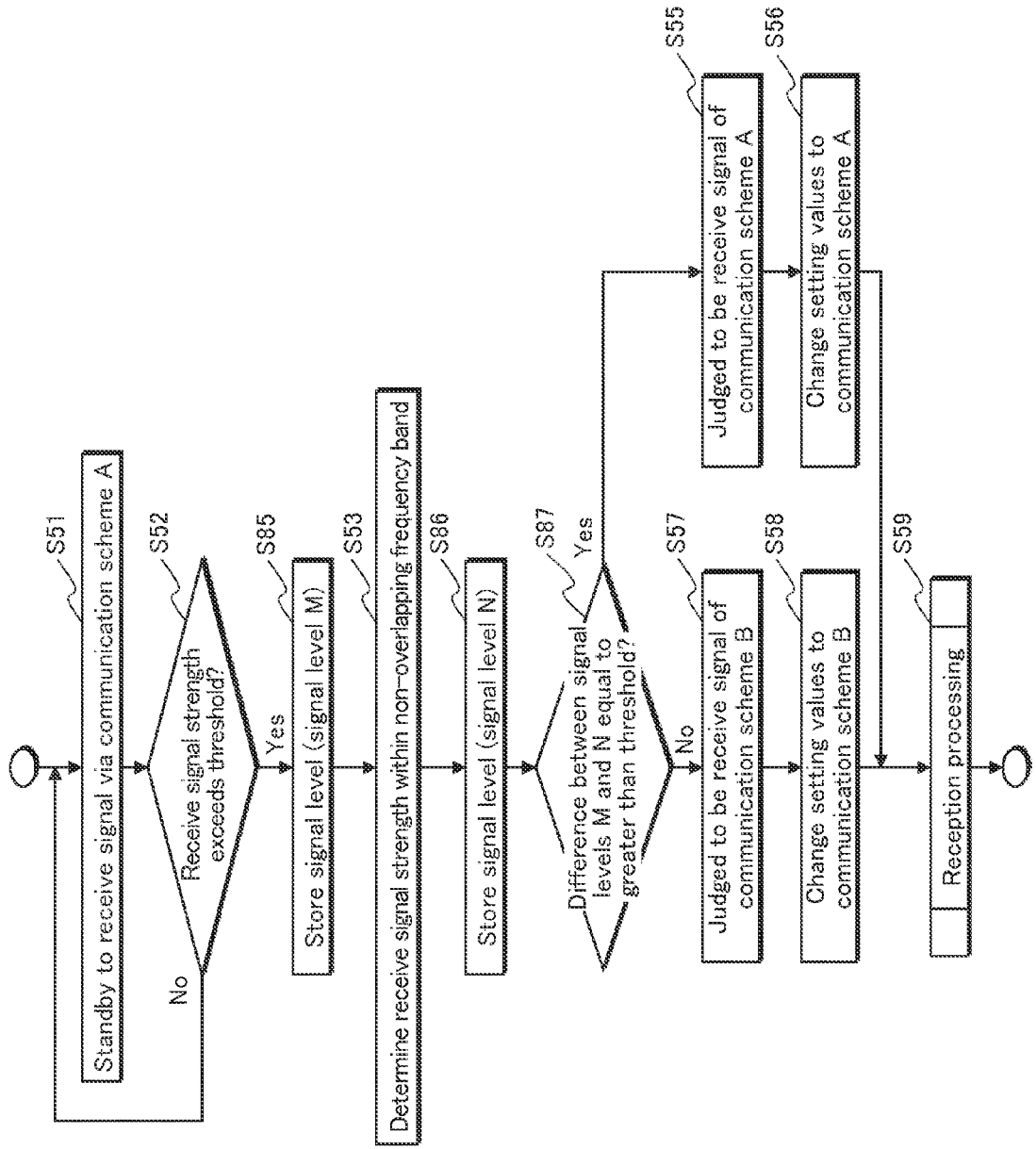
FIG. 11 is a flowchart illustrating a communication scheme judgment process of the control device in modification 2 of embodiment 1.

FIG. 11 is a flowchart illustrating a communication scheme judgment processing of receive data in modification 2 of embodiment 1. Processing that is the same as processing described with reference to FIG. 7 is assigned the same reference signs, and description thereof is omitted here.

First, the control device 1 is constantly on standby to receive a signal at a center frequency (frequency 81a in FIG. 10) of the communication scheme A (S51). Further, by using the level detection unit 13, the control device 1 constantly checks whether or not a signal strength of receive data exceeds a predefined threshold (S52).

In S52, when the signal strength exceeds the threshold ("Yes" at S52), a receive level M equal to the signal strength is stored in memory (S85). The receive level M is the receive level M in FIG. 10.

Next, the scheme judgment unit 14 changes frequency setting values of the receiver 12 to values of a non-overlapping frequency band (for example, frequency 81b in FIG. 10). Subsequently, the level detection unit 13 checks a signal strength of the receive signal within the non-overlapping frequency band (S53). The scheme judgment unit 14 stores in memory the signal strength checked in the previous step as a receive level N (S86).

Next, the scheme judgment unit 14 checks whether or not a difference between the receive level M and the receive level N is equal to or greater than a threshold (S87). As illustrated in FIG. 10, when the difference between the receive level M and the receive level N is equal to or greater than the threshold ("Yes" at S87), the scheme judgment unit 14 judges that the receive data corresponds to the communication scheme A (S55). If the difference is less than a threshold ("No" at S87), the scheme judgment unit 14 judges that the receive data corresponds to the communication scheme B (S57).

Subsequent processing (S56, S58, and S59) is the same as the processing described with reference to FIG. 7, therefore description is omitted here.

According to modification 2 of embodiment 1, the communication scheme of receive data can be determined from a difference between the signal strength within the overlapping frequency band and the signal strength within the non-overlapping frequency band.

Note that embodiment 1 of the present invention is described as a judgment method for two communication schemes, the communication scheme A and the communication scheme B, but the present invention is not limited in this way, and may easily be configured to perform judgment with respect to three or more communication schemes such as a communication scheme C, etc. In this way, the control device of this aspect of the present invention can be simultaneously on standby to receive two or more communication schemes by using a general-purpose wireless IC 1.

(Embodiment 2)

In embodiment 1, the control device detects a beginning of receive data of an unidentified communication scheme based on the signal strength of the receive data, and subsequently determines the communication scheme of the receive data by implementing carrier sense within a non-overlapping frequency band.

In embodiment 2, a frequency channel changing method is described in addition to a judgment method of a communication scheme of receive data.

A network configuration in embodiment 2 is the same as in FIG. 1 of embodiment 1, and description thereof is omitted here.

Figure 12:
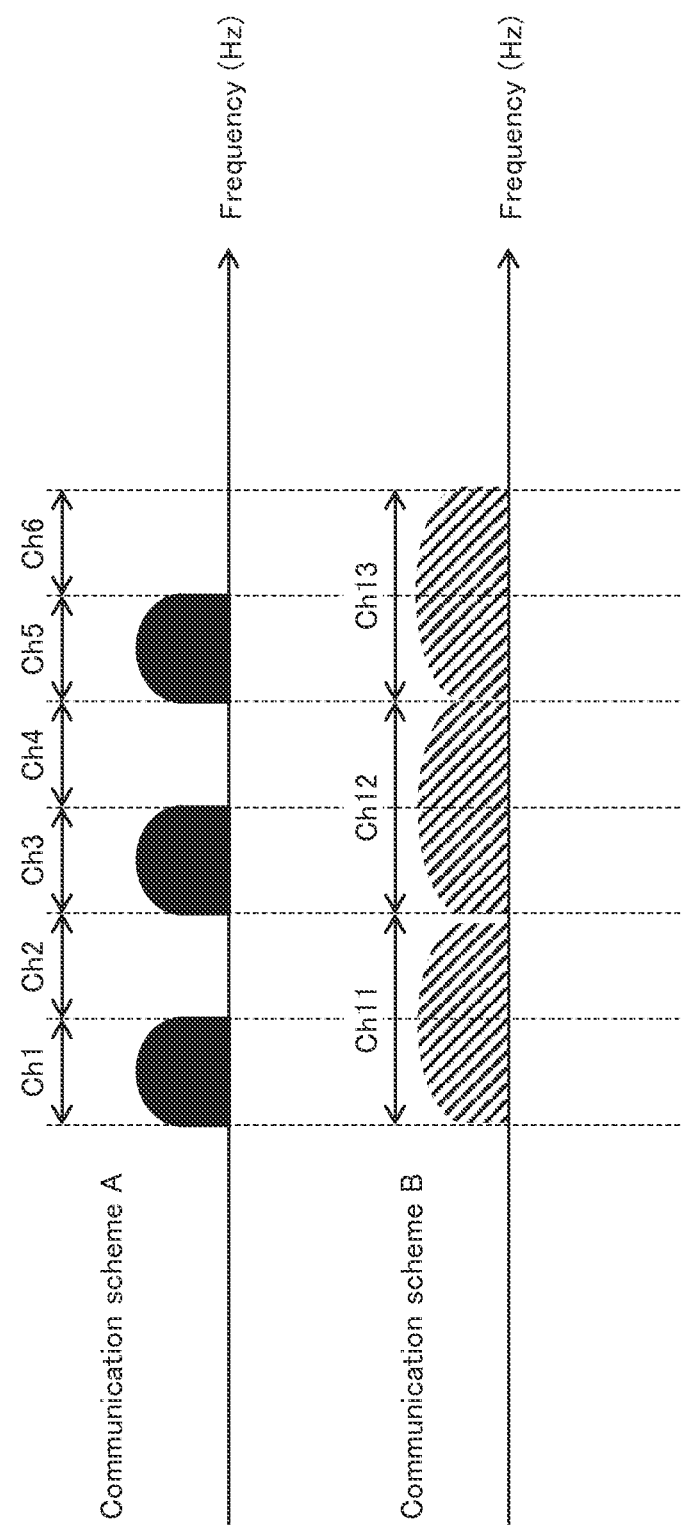
FIG. 12 is a diagram illustrating one example of frequency channels of a network system in embodiment 2.

FIG. 12 illustrates one example of frequency channels usable by a network system in embodiment 2. The communication scheme A can use Ch1, Ch3, and Ch5, and the communication scheme B can use Ch11, Ch12, and Ch13. Further, relationships between spectrum signals of all frequency channels are as illustrated in FIG. 12. In other words, beginning values of frequencies of Ch1, Ch3, and Ch5 correspond to beginning values of frequencies of Ch11, Ch12, and Ch13, respectively. Ch2, Ch4, and Ch6 of the communication scheme A are empty channels.

However, it is not necessary that a beginning value of a frequency of a channel corresponding to the communication scheme A matches a beginning value of a frequency of a channel corresponding to the communication scheme B (for example, Ch1 and Ch11). Further, between corresponding channels, it is not necessary that an ending value of a frequency of the communication scheme A matches a center frequency of the communication scheme B.

Note that allocation of frequency channels is determined in advance by an operating system.

Further, FIG. 12 illustrates an example in which the number of empty channels of the communication scheme A is one, but embodiment 2 is not limited in this way. As long as channels of the communication scheme A and the communication scheme B correspond, multiple empty channels may be provided. Further, in such a case, the communication scheme B may also be provided with an empty channel. In such a case, the level detection unit 13 performs carrier sense using an empty channel from among the empty channels.

Figure 13:
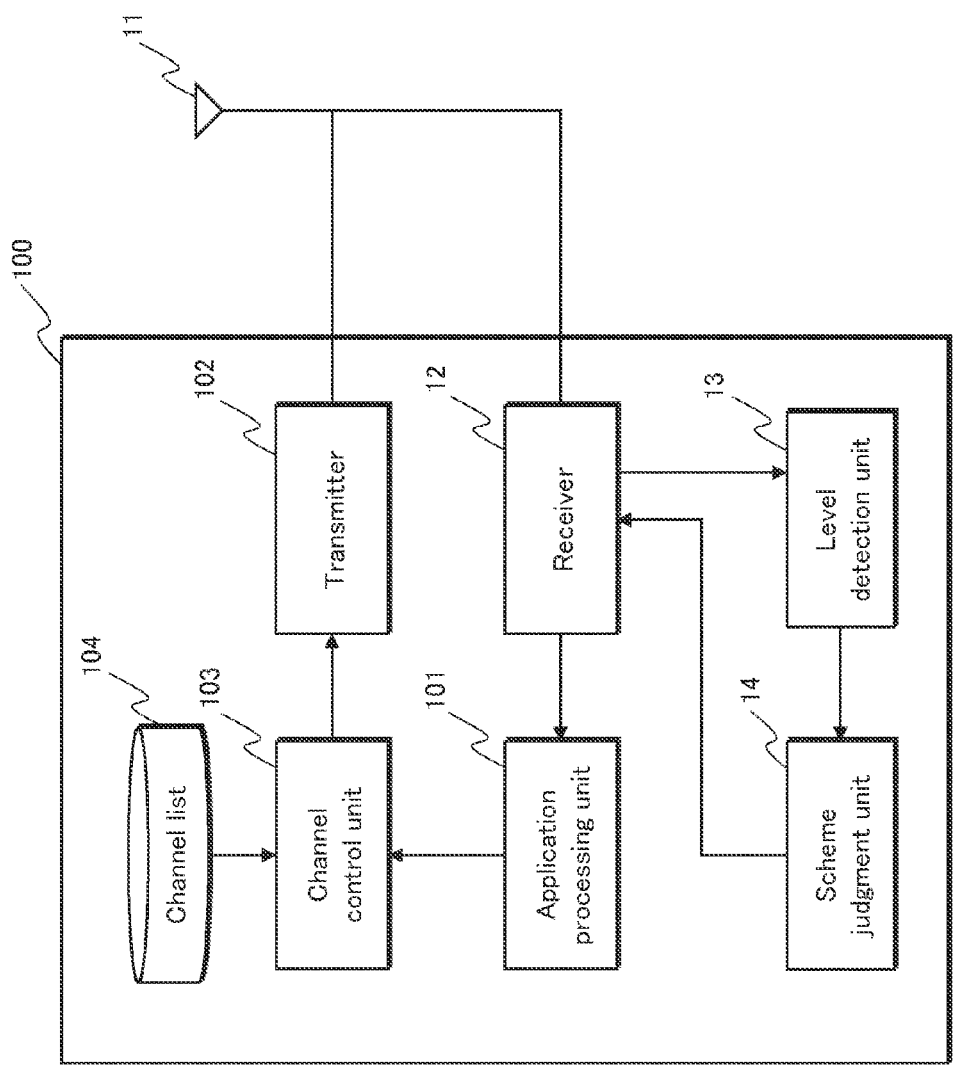
FIG. 13 is a function block diagram illustrating a configuration of a control device in embodiment 2.

FIG. 13 is a diagram illustrating an example of function blocks of a control device 100 in embodiment 2.

Blocks that have the same functions as described with reference to FIG. 4 are assigned the same reference signs, and description thereof is omitted here. In embodiment 2, the control device 100 includes an application processing unit 101, a transmitter 102, a channel control unit 103, and a channel list 104.

The application processing unit 101 has a function of executing application processing of data. Application processing is processing that analyzes data content transmitted from each terminal device, for example, analysis of a media access control (MAC) header, a MAC payload, etc. Additionally, the application processing unit 101 has a function of receiving an instruction to change a frequency channel.

The transmitter 102 transmits data to the terminal devices 2 and the terminal devices 3 via the antenna 11. Further, the transmitter 102 has a function of modulating data to be transmitted. The transmitter 102, when the application processing unit 101 receives a channel change request, transmits a channel change frame indicating that a channel is changed to the terminal devices 2 and the terminal devices 3.

The channel control unit 103 changes a frequency channel in response to an instruction of the application processing unit 101. Note that detailed operations of the channel control unit 103 are provided later using the operation flowchart of FIG. 15.

The channel list 104 is a table that includes relationships between frequency channels of the communication scheme A and frequency channels of the communication scheme B as channel selection patterns. Note that details of the channel list 104 are described later with reference to FIG. 14.

Hardware configuration in embodiment 2 is the same as in FIG. 5 and FIG. 6 of embodiment 1, and description thereof is omitted here.

Figure 14:
FIG. 14 is a table illustrating one example of a memory configuration of a channel list in embodiment 2.

FIG. 14 illustrates one example of a memory structure of the channel list 104 illustrated in FIG. 13. The channel list 104 stores, for each channel selection pattern, frequency channels of the communication scheme A and the communication scheme B. For example, in a channel selection pattern 1, the channel of the communication scheme A is Ch1 and the channel of the communication scheme B is Ch11.

Figure 15:
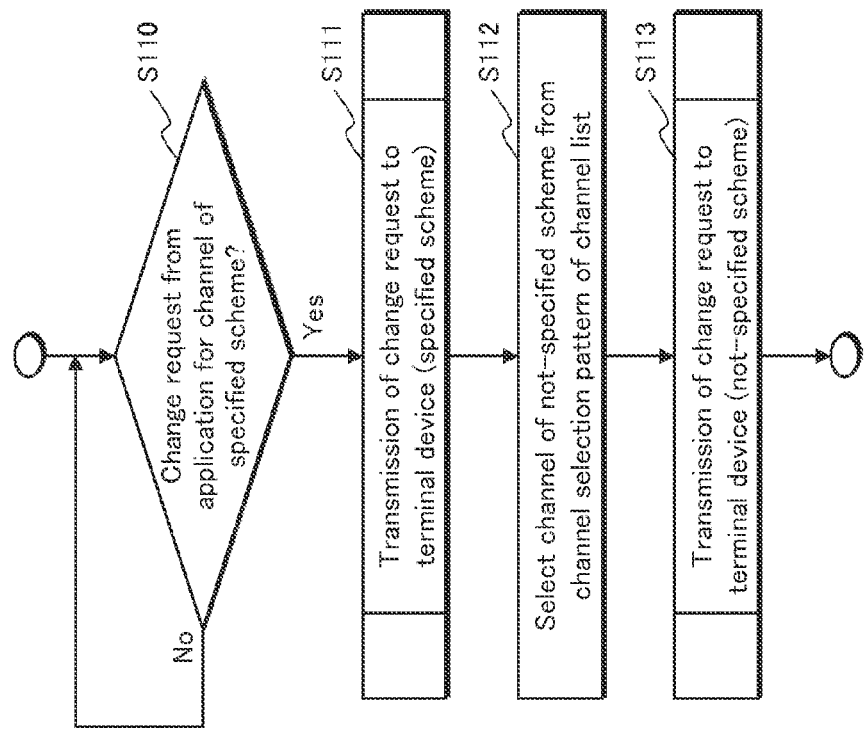
FIG. 15 is a flowchart illustrating flow of an operation in embodiment 2.

FIG. 15 is a flowchart illustrating a frequency channel change method of the control device 100 in embodiment 2 of the present invention.

Figure 16:
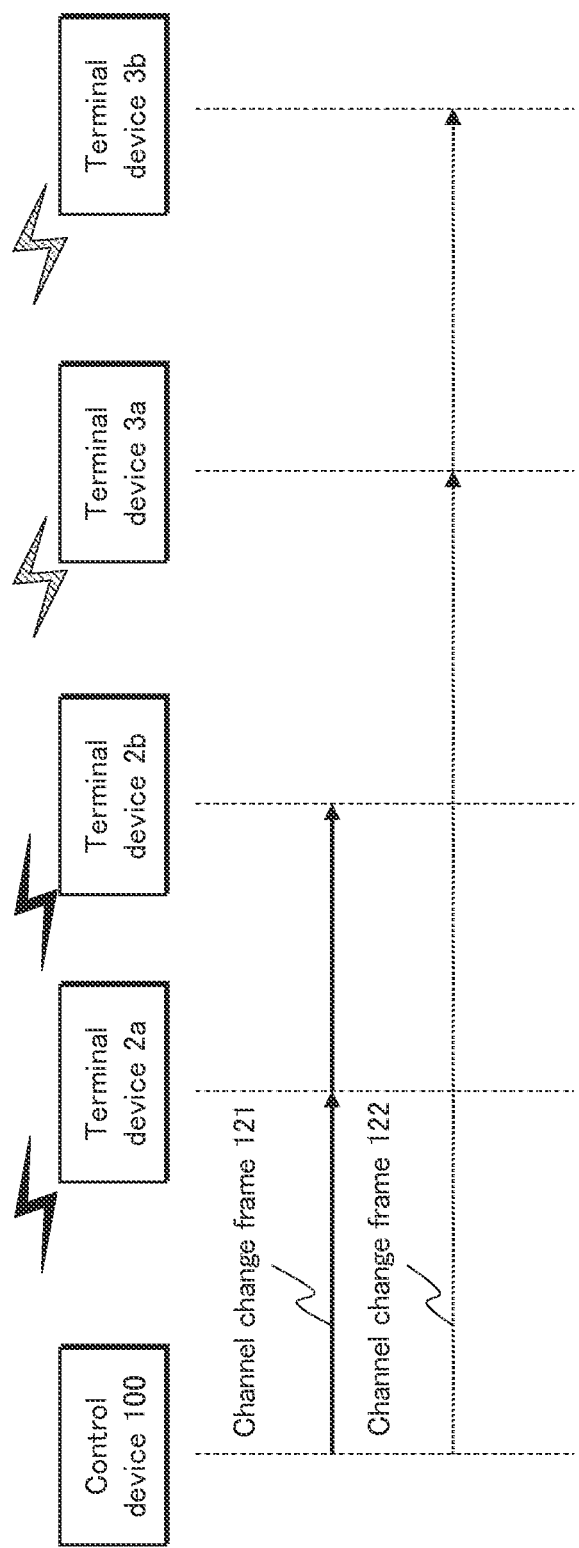
FIG. 16 is a sequence diagram illustrating exchange of data between the control device and terminal devices in embodiment 2.
Figure 17:
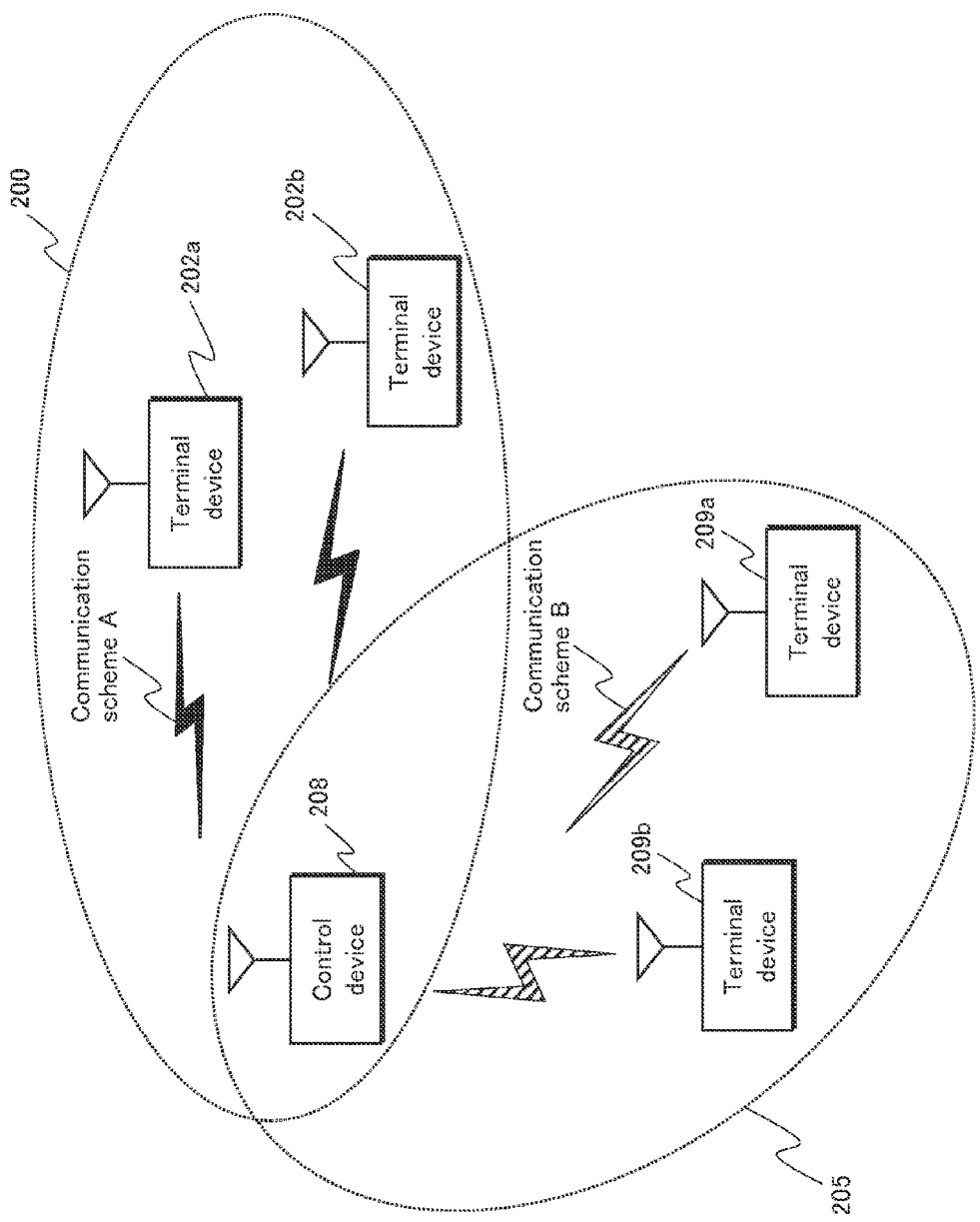
FIG. 17 is a diagram illustrating one example of a network configuration in which a plurality of communication schemes coexist.

FIG. 16 is a sequence diagram illustrating a frequency channel change method in embodiment 2 of the present invention.

An example of changing channels is described below in which the communication scheme A uses Ch1 and the communication scheme B uses Ch11, and both are changed to different channels.

The channel control unit 103 receives from the application processing unit 101 a channel change request for either communication scheme (S110 in FIG. 15). Here, as an example, the channel change request is a request to change the channel of the communication scheme A to Ch3.

First, the channel control unit 103 transmits, via the transmitter 102 and to the terminal devices 2a and 2b that communicate using the communication scheme A, a channel change frame for changing the channel of the communication scheme A from Ch1 to Ch3 (S111 in FIG. 15, 121 in FIG. 16). A transmission method for this transmission may be unicast transmission to the terminal device 2a and the terminal device 2b, or may be broadcast/multicast transmission.

Next, the channel control unit 103 refers to the channel list 104 illustrated in FIG. 14, checks the channel selection pattern corresponding to Ch3 of the communication scheme A, and selects the channel of the communication scheme B (S112 of FIG. 15). The channel selection pattern 2 corresponds to Ch3 of the communication scheme A, so the frequency channel of the communication scheme B to be changed to is Ch12.

Next, the channel control unit 103 transmits, via the transmitter 102 and to the terminal devices 3a and 3b that communicate using the communication scheme B, a channel change frame for changing the channel of the communication scheme B from Ch11 to Ch12 (S113 in FIG. 15, 122 in FIG. 16). A transmission method for this transmission may be unicast transmission to the terminal device 3a and the terminal device 3b, or may be broadcast/multicast transmission.

According to embodiment 2, one channel corresponding to one of the communication scheme A and the communication scheme B changes in response to changing of another channel corresponding to the other one of the communication scheme A and the communication scheme B. After such a change, the one channel is changed such that at least a portion of the frequency band of the channel corresponding to the one of the communication scheme A and the communication scheme B overlaps the frequency band of the channel corresponding to the other one of the communication scheme A and the communication scheme B.

In this way, for example, when a communication error rate is high due to effects of noise in a specific frequency channel, changing to another frequency channel can avoid the effects of noise. As a result, convenience is improved in terms of operation maintenance.

Above is description of embodiment 1 and embodiment 2 of the present invention.

Note that a communication mode in embodiment 1 and embodiment 2 is not limited to wireless communication, and may be wired communication via power lines (electric lighting lines), telephone lines, coaxial cables, optical cables, etc. Further, communication may be via a communication interface such as Ethernet (registered trademark), Universal Serial Bus (USB), High-Definition Multimedia Interface (HDMI) (registered trademark), IEEE 1394, etc. By such communication, the control device of the present invention is able to communicate in a variety of transmission media.

Note that processing orders of embodiment 1 and embodiment 2 may be rearranged or recombined to new configurations. For example, the operation flowchart of the control device of embodiment 2 (FIG. 15) is not limited to the processing order illustrated, and S111 may be performed after S113.

Note that although the wireless network of embodiment 1 and embodiment 2 of the present invention includes the control device and a plurality of terminal devices, direct communication between terminal devices without going through the control device is also possible. In such a case, structural functions of the control device of the present application are provided to the terminal devices, enabling the terminal devices to simultaneously standby to receive data transmitted from one terminal device to another terminal device.

Note that the configuration of embodiment 1 and embodiment 2 of the present invention may also be implemented as a program for causing execution of the program by a computer that operates via a CPU or MPU. Further, the program may also be stored on storage media such as read only memory (ROM), random access memory (RAM), etc. Alternatively, the program may be transmitted via a transmission medium such as the Internet.

Note that the configuration of embodiment 1 and embodiment 2 of the present invention is not limited to software operating via a CPU or MPU, and may typically be implemented by hardware such as a large scale integration (LSI), which is an integrated circuit. Each function may be implemented as a single chip, or all or part of the functions may be implemented on a single chip. The integrated circuit may be referred to as IC, system LSI, super LSI, ultra LSI, etc., depending on a level of integration. Further, methods of circuit integration are not limited to LSI, and implementation may be achieved by using a dedicated circuit or general-purpose processor. Furthermore, a field programmable gate array (FPGA), and/or a reconfigurable processor that allows reconfiguring of connections and settings of circuit cells within an LSI may be used. Furthermore, if circuit integration technology to replace LSI arises due to progress in semiconductor technology and other derivative technologies, such technology may of course be used to perform integration of function blocks.

INDUSTRIAL APPLICABILITY

The present invention is applicable to communication control devices of wireless or wired communication networks for which coexistence of a multiple communication schemes is required.

REFERENCE SIGNS LIST 1, 100, 208 control device
2, 3, 202a, 202b, 209a, 209b terminal device
11 antenna
12 receiver
13 detection unit
14 scheme judgment unit
15, 101 application processing unit
17 wireless IC
18, 19 MCU
102 transmitter
103 channel control unit
104 channel list

The invention claimed is:
1. A communication device comprising:
a receiver that receives a signal transmitted via a communication network, the signal being transmitted within one of a frequency band of a channel corresponding to a first communication scheme and a frequency band of a channel corresponding to a second communication scheme that includes an overlap frequency band that overlaps at least a portion of the frequency band corresponding to the first communication scheme;
a detection unit that detects a first signal strength of the signal received by the receiver within the overlap frequency band; and
a reception control unit that, when the first signal strength exceeds a predefined threshold, causes the detection unit to detect a second signal strength within a frequency band that corresponds to one of the first communication scheme and the second communication scheme and does not overlap with the overlap frequency band, judges whether the signal received by the receiver corresponds to the first communication scheme or the second communication scheme based on the second signal strength, and performs reception processing of the signal according to one of the first communication scheme and the second communication scheme, according to the judgment.

2. The communication device of claim 1, wherein
a center frequency of the channel corresponding to the second communication scheme is higher than a center frequency of the channel corresponding to the first communication scheme,
when the first signal strength exceeds the predefined threshold, the detection unit detects the second signal strength in a frequency band corresponding to the second communication scheme that is higher than the overlap frequency band and does not overlap with the overlap frequency band, and when the second signal strength exceeds a predefined threshold, the reception control unit judges that the signal received by the receiver corresponds to the second communication scheme.

3. The communication device of claim 2, wherein
when the second signal strength is equal to or less than the predefined threshold, the reception control unit judges that the signal received by the receiver corresponds to the first communication scheme.

4. The communication device of claim 1, wherein
the frequency band of the channel corresponding to the second communication scheme is broader than the frequency band of the channel corresponding to the first communication scheme,
the frequency band of the channel corresponding to the first communication scheme is included within the frequency band of the channel corresponding to the second communication scheme, and
a start value of the frequency band of the first communication scheme and a start value of the frequency band of the second communication scheme are set to be equal.

5. The communication device of claim 1, wherein
a center frequency of the channel corresponding to the second communication scheme is higher than a center frequency of the channel corresponding to the first communication scheme,
when the first signal strength exceeds the predefined threshold, the detection unit detects the second signal strength in a frequency band corresponding to the first communication scheme that is lower than the overlap frequency band and does not overlap with the overlap frequency band, and
when the second signal strength exceeds a predefined threshold, the reception control unit judges that the signal received by the receiver corresponds to the first communication scheme.

6. The communication device of claim 5, wherein
when the second signal strength is equal to or less than the predefined threshold, the reception control unit judges that the signal received by the receiver corresponds to the second communication scheme.

7. The communication device of claims 1, further comprising:
a channel control unit that changes channels corresponding to one of the first communication scheme and the second communication scheme in response to a change of channels corresponding to the other one of the first communication scheme and the second communication scheme, wherein
the channel control unit changes the channels corresponding to the one of the first communication scheme and the second communication scheme such that at least a portion of the frequency band of one channel after the change corresponding to the one of the first communication scheme and the second communication scheme overlaps at least a portion of the frequency band of the other channel after the change corresponding to the other one of the first communication scheme and the second communication scheme.

8. The communication device of claim 7, further comprising:
a channel list storage unit that stores a channel list of combinations of channels corresponding to each communication scheme, according to which at least a portion of a frequency band of each channel corresponding to the first communication scheme overlaps at least a portion of a frequency band of a corresponding channel corresponding to the second communication scheme, wherein
the channel control unit changes the channels corresponding to the one of the first communication scheme and the second communication scheme by referencing the channel list storage unit.

9. The communication device of claim 1, wherein
when a difference value between the first signal strength and the second signal strength is at least a predefined value, the reception control unit judges that the communication scheme of the signal received by the receiver is the first communication scheme, and when the difference value is less than the predefined value, the reception control unit judges that the communication scheme of the signal received by the receiver is the second communication scheme.

10. The communication device of claim 1, wherein
at least one empty channel is allocated to each interval between channels corresponding to the first communication scheme, and
the detection unit detects the second signal strength by using the at least one empty channel.

11. The communication device of claim 10, wherein
the at least one empty channel is provided in a plurality, and
the detection unit detects the second signal strength by using an empty channel from among the plurality of empty channels.

12. The communication device of claim 1, wherein
a transmission bandwidth of the second communication scheme is an integer multiple of a transmission bandwidth of the first communication scheme.

13. The communication device of claim 12, wherein
the transmission bandwidth of the first communication scheme is 200 kHz and the transmission bandwidth of the second communication scheme is 400 kHz.

14. The communication device of claim 1, wherein
the communication network is a wireless communication network.

15. A method of judging a communication scheme of receive data, executed by a communication device that receives data corresponding to different communication schemes via a communication network, the method comprising:
receiving a signal transmitted within one of a frequency band of a channel corresponding to a first communication scheme and a frequency band of a channel corresponding to a second communication scheme that includes an overlap frequency band that overlaps at least a portion of the frequency band corresponding to the first communication scheme;
detecting a first signal strength of the signal within the overlap frequency band; and
when the first signal strength exceeds a predefined threshold, detecting a second signal strength within a frequency band that corresponds to one of the first communication scheme and the second communication scheme and that does not overlap with the overlap frequency band, judging whether the signal corresponds to the first communication scheme or the second communication scheme based on the second signal strength, and performing reception processing of the signal according to either the first communication scheme or the second communication scheme, according to the judgment.

16. An integrated circuit comprising:
a receiver that receives a signal transmitted via a communication network, the signal being transmitted within one of a frequency band of a channel corresponding to a first communication scheme and a frequency band of a channel corresponding to a second communication scheme that includes an overlap frequency band that overlaps at least a portion of the frequency band corresponding to the first communication scheme;

a detection unit that detects a first signal strength of the signal received by the receiver within the overlap frequency band; and a reception control unit that, when the first signal strength exceeds a predefined threshold, causes the detection unit to detect a second signal strength within a frequency band that corresponds to one of the first communication scheme and the second communication scheme and does not overlap with the overlap frequency band, judges whether the signal received by the receiver corresponds to the first communication scheme or the second communication scheme based on the second signal strength, and performs reception processing of the signal according to one of the first communication scheme and the second communication scheme, according to the judgment.

17. A program that causes a computer to execute a process of judging a communication scheme of receive data, which is executed by a communication device that receives data corresponding to different communication schemes via a communication network, the process comprising:

receiving a signal transmitted within one of a frequency band of a channel corresponding to a first communication scheme and a frequency band of a channel corresponding to a second communication scheme that includes an overlap frequency band that overlaps at least a portion of the frequency band corresponding to the first communication scheme;

detecting a first signal strength of the signal within the overlap frequency band; and when the first signal strength exceeds a predefined threshold, detecting a second signal strength within a frequency band that corresponds to one of the first communication scheme and the second communication scheme and that does not overlap with the overlap frequency band, judging whether the signal corresponds to the first communication scheme or the second communication scheme based on the second signal strength, and performing reception processing of the signal according to either the first communication scheme or the second communication scheme, according to the judgment.

* * * * *